US011155041B2

(12) United States Patent
Inziello

(10) Patent No.: US 11,155,041 B2
(45) Date of Patent: Oct. 26, 2021

(54) METHODS OF GENERATING ENERGY TRANSMISSION PROPERTIES IN VOXEL DATA STRUCTURES USING TEXTURE MAPS

(71) Applicant: University of Central Florida Research Foundation, Inc., Orlando, FL (US)

(72) Inventor: James Inziello, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 29 days.

(21) Appl. No.: 16/834,661

(22) Filed: Mar. 30, 2020

(65) Prior Publication Data

US 2020/0307105 A1 Oct. 1, 2020

Related U.S. Application Data

(60) Provisional application No. 62/826,658, filed on Mar. 29, 2019.

(51) Int. Cl.
*B29C 64/393* (2017.01)
*B33Y 50/02* (2015.01)
(Continued)

(52) U.S. Cl.
CPC ............ *B29C 64/393* (2017.08); *B33Y 50/02* (2014.12); *G05B 19/4099* (2013.01);
(Continued)

(58) Field of Classification Search
CPC ....... B29C 64/393; B33Y 50/02; G06F 16/56; G06F 30/10; G05B 19/4099
(Continued)

(56) References Cited

U.S. PATENT DOCUMENTS

| 9,827,719 B2* | 11/2017 | Kautz | B29C 64/393 |
| 10,532,555 B2* | 1/2020 | Chan | B33Y 50/02 |
| 2018/0194127 A1* | 7/2018 | Chan | B29C 64/106 |

OTHER PUBLICATIONS

Brunton, Alan, et al. "3D printing spatially varying color and translucency." ACM Transactions on Graphics (TOG) 37.4 (2018): 1-13. (Year: 2018).*

(Continued)

*Primary Examiner* — Mohammad Ali
*Assistant Examiner* — Joshua T Sanders
(74) *Attorney, Agent, or Firm* — Paul Murty; Smith & Hopen, P.A.

(57) ABSTRACT

A procedural approach toward optical characterization of subsurface scattering of light to generate a mixture of optically opaque materials and optically transparent materials, with a scattering map projected from the surface toward the center of mass of a model. The resulting voxel slices communicate with an additive manufacturing printer, with the resulting model using a typical CMYK and white mixture, with the addition of transparency keyed to the alpha channel of the voxel slice texture maps, to create an accurate model. The resulting stack of textures have color values for the voxels at the surface that are extrapolated downward to the center of the mass from the surface normal, thereby creating a color and texture spectrum from the surface normal to the center of mass, to more accurately represent color and texture on a printed object.

17 Claims, 10 Drawing Sheets
(9 of 10 Drawing Sheet(s) Filed in Color)

(51) Int. Cl.
  *G06F 30/10*    (2020.01)
  *G06F 16/56*    (2019.01)
  *G05B 19/4099*  (2006.01)
  *G06F 113/10*   (2020.01)

(52) U.S. Cl.
  CPC .............. *G06F 16/56* (2019.01); *G06F 30/10* (2020.01); *G05B 2219/35134* (2013.01); *G05B 2219/49008* (2013.01); *G06F 2113/10* (2020.01)

(58) Field of Classification Search
  USPC ......................................................... 700/98
  See application file for complete search history.

(56) References Cited

OTHER PUBLICATIONS

Hasan, Miloš, et al. "Physical reproduction of materials with specified subsurface scattering." ACM SIGGRAPH 2010 papers. 2010. 1-10. (Year: 2010).*

* cited by examiner

METHODS OF GENERATING ENERGY TRANSMISSION PROPERTIES IN VOXEL DATA STRUCTURES USING TEXTURE MAPS

CROSS-REFERENCE TO RELATED APPLICATIONS

This nonprovisional application is a continuation of and claims priority to provisional application No. 62/826,658, entitled "Methods of generating energy transmission properties in voxel data structures using texture maps," filed Mar. 29, 2019, by the same inventor.

BACKGROUND OF THE INVENTION

1. Field of the Invention

This invention relates, generally, to texture mapping in additive manufacturing processes. More specifically, it relates to a method of generating optical properties for a voxel data structure via texture mapping and by using a combination of texture types (such as albedo maps, roughness maps, metalness maps, subsurface luminance maps, and other similar textures) to accurately reflect desired texture characteristics in a manufactured object.

2. Brief Description of the Prior Art

Typical three-dimensional printing (or additive manufacturing) projects suffer from an inability to accurately depict color and texture gradients on a virtual model and a subsequently-printed physical object based on the virtual model. Because current methods of additive manufacturing fail to provide accurate representations of color and texture gradients, the associated optical properties of printed objects are also inaccurate, causing a decrease in the value of the printed objects. For example, prior art additive manufacturing methods utilize color data from a single RGB (red, green, and blue, typically used in digital designs) texture on the surface of a model, thereafter converting the RGB data to percentages of a CMYK (cyan, magenta, yellow, and key/black, typically used in physical printing) color system and a white color system. The CMYK color system is utilized because the color hues in the system can be combined to form various colors in a color spectrum. While the voxels on the surface of an additive manufactured object are colored, the underlying area of the object is unutilized and typically colored in a consistent and unimportant way—such as being colored solid white, opaque, or with another given color or material. This typical system is depicted in FIG. 1, which depicts a surface of a voxel mesh colored in RGB and converted to a CMYK and white mixture to texture the surface of the mesh, with white material used on underlying voxels.

Attempts have been made to improve the coloring and textures of additive manufactured objects. For example, a three-dimensional printer marketed under the trade name STRATASYS J750® includes an associated voxel printing software that utilizes a series of .png (portable network graphics) images to create voxel slices with specific RGB values corresponding to dithered (a color depth created by approximations of colored pixels from an available color palette, used to print colors not in a color palette) CMYK and white values. The printer and software can also use the alpha channel (defining areas of transparency in an image) in voxel slices (also referred to as .png images) to control the deposition of clear photopolymer resin, soft materials, or other materials. In prior art methods, RBG values are used to color the surface of an object; however, underlying subsurface color maps are lacking, as the subsurface is typically colored with a white resin (or other uniform material), resulting in final objects that fail to accurately replicate a color and/or texture map for an object.

There is no current system or process that allows a designer to specify and print underlying properties, including colors and textures, of a voxel system to achieve realistic transfers and bounces of light in a 3D printed object. Accordingly, what is needed is a system and method that produced more optically accurate 3D printed objects by allowing customization of underlying optical properties. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a system and method for creating optically-accurate 3D printed objects by providing for accurate underlying optical properties of the objects is now met by a new, useful, and nonobvious invention.

The novel method includes a step of generating a virtual three-dimensional model of an object to be printed via additive manufacturing. The three-dimensional model is divided into a plurality of surface voxels on a surface of the model overlaying a plurality of subsurface voxels beneath the surface of the model. Each of the plurality of surface voxels and each of the plurality of subsurface voxels is equal in size, shape, volume, and area. A texture map is calculated for each of the plurality of surface voxels. The calculated texture map is projected from the surface of the three-dimensional model to a center point of the model to generate a gradient of the texture map from the plurality of surface voxels to the center point, thereby overlaying the texture map gradient onto the plurality of subsurface voxels. At least one texture and at least one material are selected from a database, selected to match the calculated texture map and the generated gradient of the three-dimensional model. The selected at least one texture and the selected at least one material are applied to the plurality of surface voxel and the plurality of subsurface voxels. An additive manufacturing machine is instructed to manufacture a printed three-dimensional object including the selected at least one texture and the selected at least one material.

An embodiment of the method includes a step of generating a support material layer on an outer surface of the virtual three-dimensional model. The step of instructing the additive manufacturing machine to manufacture the printed three-dimensional object may include a step of instructing the additive manufacturing machine to overlay the support material on an outer surface of the printed three-dimensional object. The method may include a step of generating a micro interface on the outer surface of the virtual three-dimensional model prior to the step of instructing the additive manufacturing machine to manufacture the printed three-dimensional object, such that the printed three-dimensional object includes a micro interface layer between the outer surface of the printed three-dimensional object and the support material, thereby facilitating removal of the support material from the printed three-dimensional object.

The method may include a step of calculating a subsurface scattering map for each of the plurality of surface voxels and for each of the plurality of subsurface voxels. Moreover, the step of projecting the calculated texture map from the surface of the three-dimensional model to the center point of the model may include a step of assigning texture percentages to each of the plurality of subsurface voxels to create the texture gradient. The selected at least one texture and the selected at least one material may be calibrated for at least one of the plurality of voxels by comparing the selected at least one texture and the selected at least one material to the virtual model.

The novel method includes a step of generating a voxel counterpart to match a virtual model of a 3D object, with the voxel counterpart including a plurality of voxels. Each of the plurality of voxels is equal in size, shape, and area. The method includes a step of building a projection for the plurality of voxels from a surface of the virtual model to a center point of the virtual model. The virtual model is analyzed to determine a color map and a texture map. Based on the maps, a color and a material are selected to match the color map and the texture map of the virtual model to create a spectrum of colors and textures from the surface of the virtual model to the center point of the virtual model. Then, a 3D printed object based on the virtual model is generated, the object including the selected color and material for each voxel. The method may include a step of assigning color percentages to each of the plurality of voxels. The method may further include a step of analyzing the virtual model to determine a transparency map. The selected color and material can be calibrated by comparing the selections to the virtual model.

An object of the invention is to improve the accuracy of 3D printed objects by allowing for intricate customization of underlying color and texture properties of the objects, thereby improving the optical properties of the objects.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

The patent or application file contains at least one drawing executed in color. Copies of this patent or patent application publication with color drawings will be provided by the Office upon request and payment of the necessary fee.

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes a voxel slicer including a procedural approach toward optical characterization of subsurface scattering of light to generate a mixture of optically opaque materials and optically transparent materials, with a scattering map projected from the surface toward the center of mass of a model. The resulting voxel slices communicate with an additive manufacturing printer, with the resulting model using a typical CMYK and white mixture, with the addition of transparency keyed to the alpha channel of the voxel slice texture maps, to create an accurate model. The resulting stack of textures have color values for the voxels at the surface that are extrapolated downward to the center of the mass from the surface normal, thereby creating a color and texture spectrum from the surface normal to the center of mass, to more accurately represent color and texture on a printed object.

The light transmission properties of objects are procedurally created using texture mapping on the surface shell of a polygonal model. The input textures are made using any physics-based rendering (PBR) production tool or image editing tool. These texture maps can consist of 1 or more data channels. In the case of a 16-bit channel greyscale texture, an individual pixel can represent 32,768 possible gradations of grey. A portion or the entirety of the gradient can determine the material properties of the voxels that are adjacent to that pixel on a texture map wrapped around the 3d mesh surface.

Figure 1:
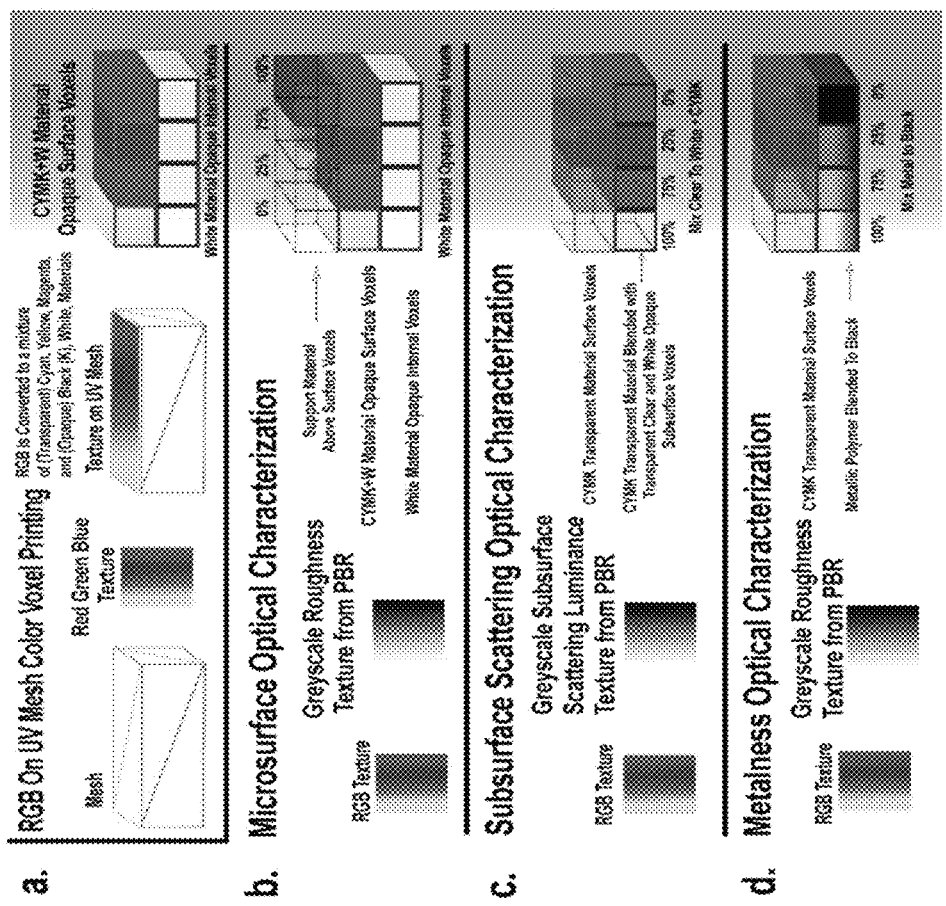
FIG. 1 depicts a current method for color voxel printing in subsection (a), and present methods of accomplishing color voxel printing of increased accuracy in subsections (b)-(d).

The combinations of resulting mixtures of printing materials that are generated at a voxel level determine optical properties, such as those found in PBR. These optical properties include surface specularity (i.e., the voxels above the surface being made of wash-away support material for a glossy to completely matte surface); subsurface scattering (i.e., voxels beneath the surface and propagated to the center of a volume found below are scattered on a concave surface normal from 100% to 0% material opacity); and metalness (i.e., properties at the surface have a metal reflectivity of 100% to 0%). Subsections (b)-(d) of FIG. 1 provide representations of the surface specularity (in subsection (b)), subsurface scattering (in subsection (c)) and metalness characterization (in subsection (d)), as discussed above. These optical properties are captured in the methods of the present invention, and, particularly in combination, represent an improvement over prior art methods of printing a 3D object using mesh color voxel printing, as shown in subsection (a) of FIG. 1.

Other optical properties can be defined inside a 3D mesh using texture maps to plot out optical guides for wave propagations throughout the voxel system (wave guides), which are defined by a path map and cross section shape/color frequency/depth maps, similar to the logic gates of a silicon microchip and a depth map to control where in the 3D structure the path will occur. The voxel mapping system will be discussed in further detail below.

The generated voxel data structures are produced during the voxel slicing process, where the volumetric pixels are defined by their proximities to a pixel on the mapped texture and their distance from the surface normal of the 3D mesh. Current generations of voxel data derived from 3D meshes for additive manufacturing use color data from a single RGB texture on the surface of a model, which are converted to percentages of CMYK and White materials mixed and used at the boundary layer of voxels on the skin of the model. The model beneath that area is typically either solid white or made of another material (as defined by the header file for the series of sliced .png images for voxel printing on an additive manufacturing device). As a result, the underlying area is underutilized, and methods in accordance with the present invention enhance the optical properties of underlying voxels, thereby increasing the optical accuracy of the 3D printed object.

Subsections (b)-(d) of FIG. 1 depict methods of utilizing the underlying subsurface of an object to produce more accurate models and 3D printed objects based on the models. Each of the methods (i.e., the microsurface optical characterization depicted in subsection (b); the subsurface scattering optical characterization depicted in subsection (c); and the metalness optical characterization depicted in subsection (d)) represent improvements over the prior art methods depicted in subsection (a) of FIG. 1, and can be used alone, or, preferably, in combination with one another. To produce the desired optical properties under the methods represented in subsections (b)-(d), the methods described herein include a step of building a voxel counterpart to the model, thereby creating sections of the model of equal size, shape, and area. The voxel counterpart may be referred to as a mesh, and during the voxelization of the mesh, the method includes a step of measuring the mesh's texture set, roughness map, color map, subsurface scattering, transparency map, and other useful metrics to determine accurate optical properties. The method then builds a projection of voxel cells from the surface of the mesh to a center point of the model, thereby creating a subsurface spectrum of optical properties. The percentage and type of materials deposited in each voxel cell of the model are calibrated to approximate the same light transmission found in a real-time PBR renderer. As such, the methods of the present invention result in highly accurate 3D printed objects after the slices of the mesh and model are rendered as .png images and transmitted to a 3D printer for the creation of a physical object.

Figure 2:
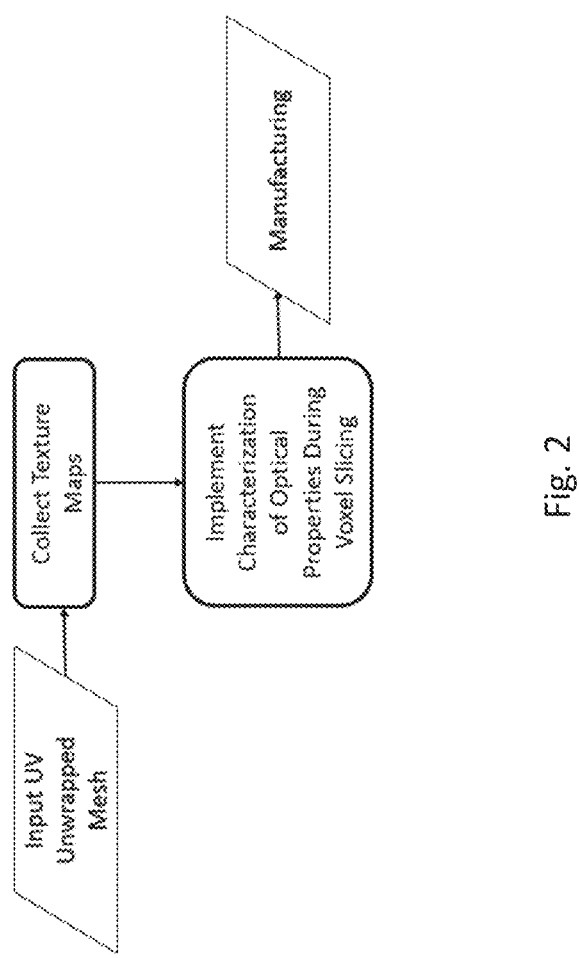
FIG. 2 is a flowchart depicting a method of manufacturing a 3D printed object having enhanced optical characteristics.
Figure 3A:
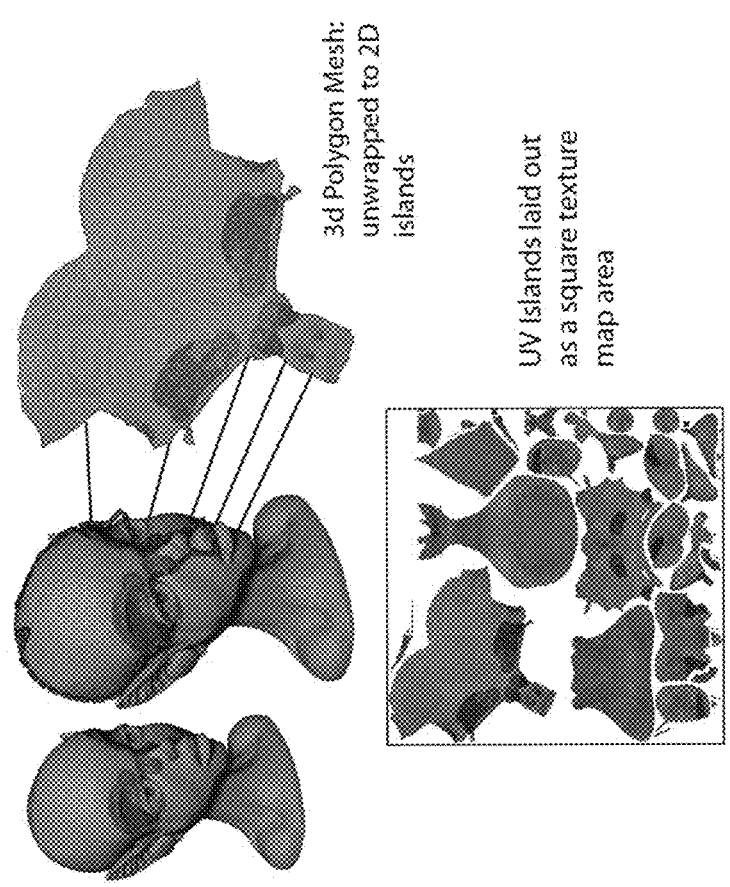
FIG. 3A depicts a three-dimensional model unwrapped into a plurality of two-dimensional segments.
Figure 3B:
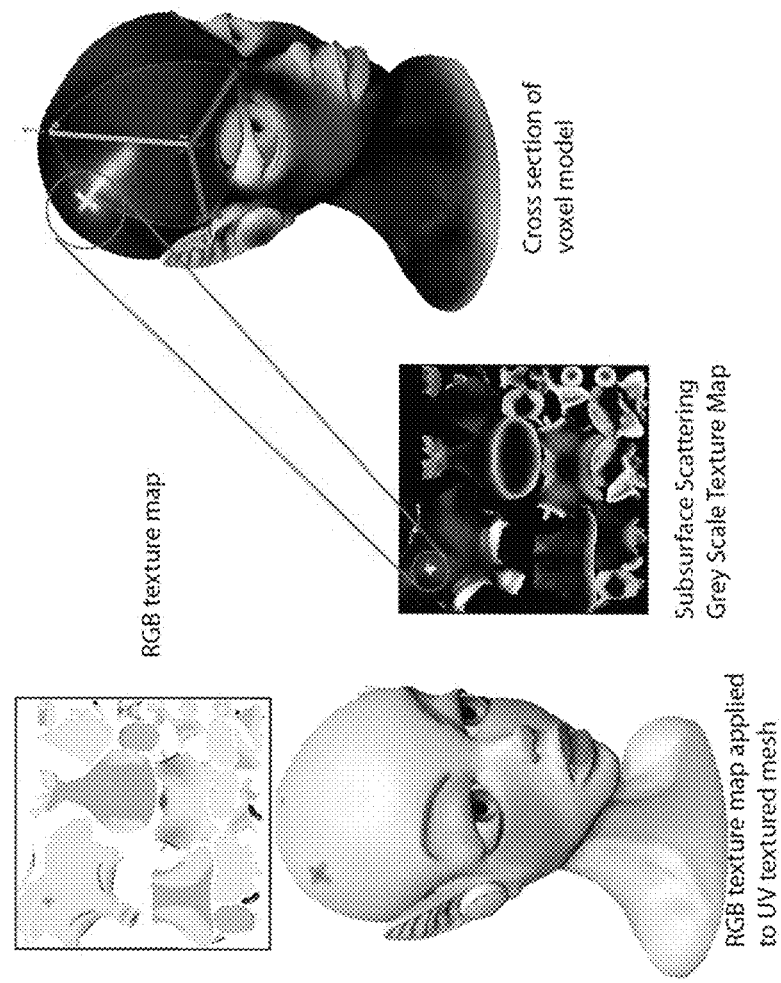
FIG. 3B depicts the application of texture maps on an unwrapped model, such as the model of FIG. 3A.

FIG. 2 provides an overview of a method in accordance with an embodiment of the present invention. The method is founded on the principles of PBR, 3D polygonal model structures, UV mapping of polygonal models, voxel data structures, and additive manufacturing. The method relies on using the existing texture sets created to accurately render a 3D polygonal model in a virtual space, such as a real-time game engine. The texture sets are generated via programs that use industry standard physics-based models for real-time rendering of material properties displayed on 3D polygonal objects. In the method depicted in FIG. 2, an input UV unwrapped mesh is disposed over a surface of a virtual model and becomes the main input to be modified within the system. An example of a UV unwrapped mesh is provided in FIG. 3A, depicting a three-dimensional figure that is separated and unwrapped into two-dimensional segments in a square texture map area. Accordingly, the texture maps are collected from the virtual model, and a procedure including voxel slicing is implemented to characterize the optical properties of the virtual model and mesh. For example, FIG. 3B depicts a RGB texture map applied to a UV textured mesh (such as that of FIG. 3A), with a subsurface scattering grey scale texture map applied thereto. The cross-section of the voxel model (shown in white) represents transparency propagation to the center of the voxel (value 1) from the surface normal (value 0) in each direction. After the desired optical properties are chosen, a physical object is manufactured based on the virtual model.

Figure 4B:
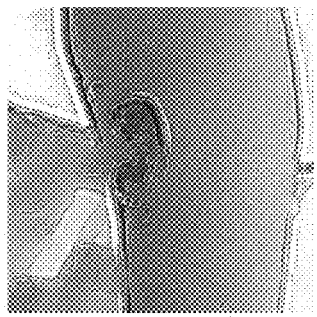
FIG. 4B depicts a texture (or roughness) map of an image.
Figure 4C:
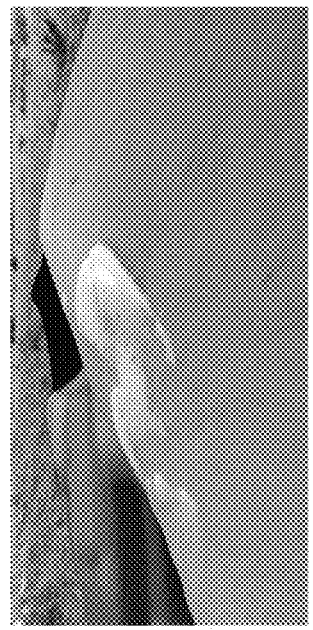
FIG. 4C depicts an implementation of a color map and a roughness texture map in a real-time physics-based rendering (PBR) engine.
Figure 4A:
FIG. 4A depicts a color map of an image.

FIGS. 4A-4C depict the implementation of a color map and a roughness map in a real-time PBR engine. More specifically, FIG. 4A depicts a color map of a given image, with the image including a plurality of colors that must be accurately replicated in a final implementation. FIG. 4B depicts a roughness map of the same given image, showing varying levels of depth of the image that must also be accurately replicated in a final implementation. The final implementation of both the color map of FIG. 4A and the roughness map of FIG. 4B is depicted in FIG. 4C, which provides a real-time PBR engine rendering of the subject matter of each of FIGS. 4A and 4B. FIG. 4C provides an example of the methods described herein used to accurately render a relatively simplistic image, including both color and texture (i.e., roughness) characteristics of the original image.

Figure 5:
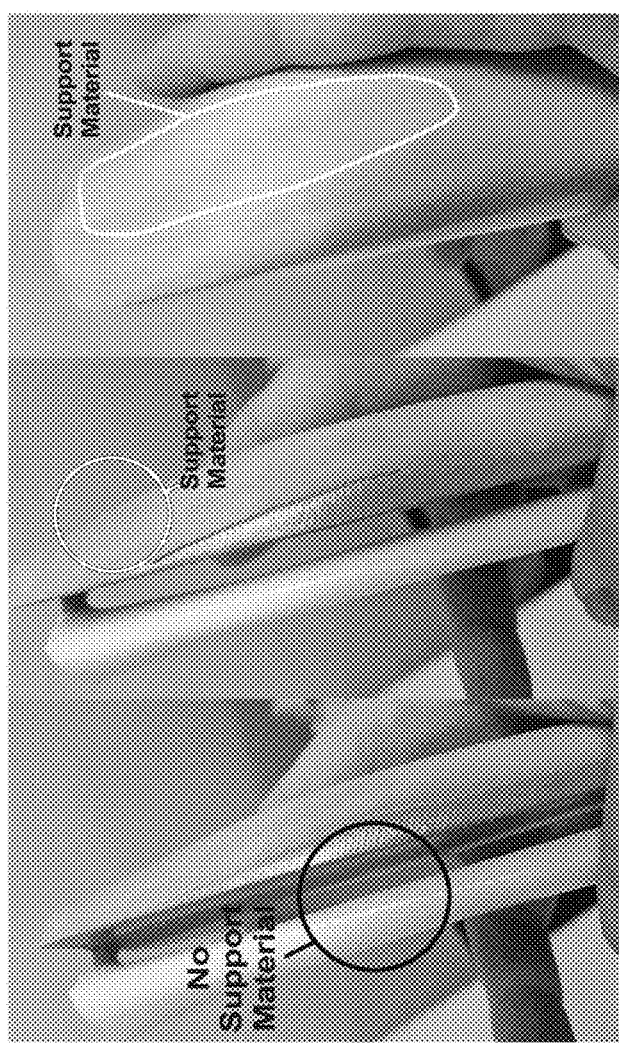
FIG. 5 depicts an example of a printed object including a portion having a glossy surface (having no support material) and a portion having roughness and texture as a result of support material covering the surface of the object during printing.

Turning now to FIG. 5, a 3D printed object is depicted which has been printed in accordance with the methods described herein. As shown in FIG. 5, the 3D printed object includes two distinct sections-one is depicted as glossy white and flesh textures, and the other is depicted as colored and includes a noticeable matte surface. As FIG. 5 notes, the glossy white and flesh section is printed without any support material in accordance with methods utilized in the prior art and discussed above. The colored, matte surface section was printed with a support material, as described in the methods herein. Specifically, the colored, textured section included a layer of post-process removable support material covering the printing surface during the additive manufacturing process, thereby causing a micro interfacing between the object's final surface and the removable support material. As such, FIG. 5 provides an example of a physical object printed in accordance with the teachings of the present methods to accurately render a matte surface on the printed object.

Figure 6:
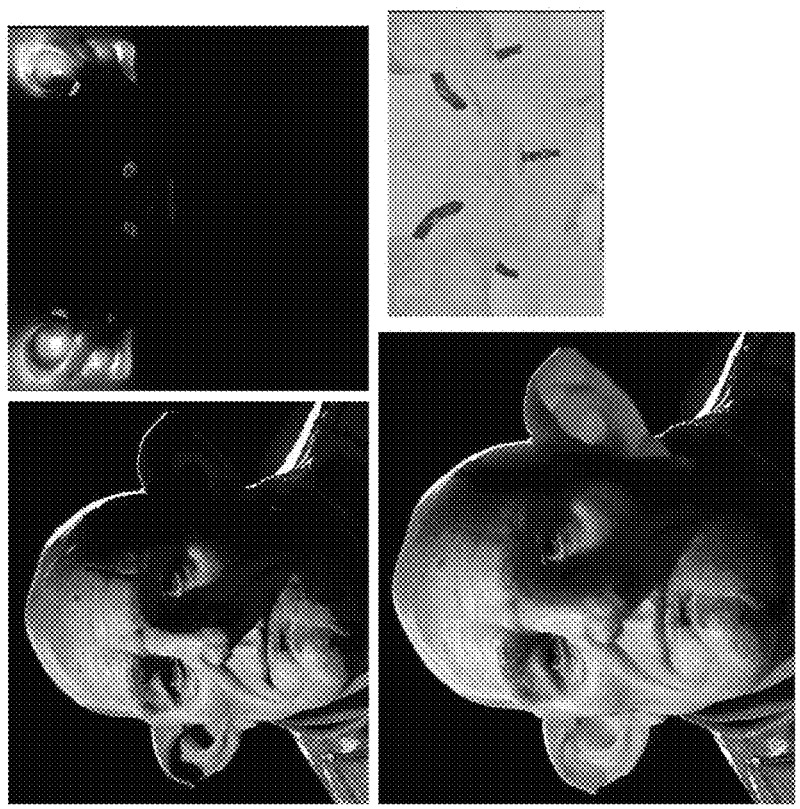
FIG. 6 depicts a series of images showing subsurface scattering on a 3D model.

Similarly, FIG. 6 depicts examples of subsurface scattering methods, in accordance with an embodiment of the present invention. The top-left portion of FIG. 6 depicts a standard, initial model without subsurface scattering—this model may be referred to as an original input. The top-right portion of FIG. 6 depicts a luminance map generated for the initial model of FIG. 6. The luminance map is important in that the map allows for the control of subsurface scattering on the initial model. The bottom-left portion of FIG. 6 depicts the transmission of white light through the mesh from a light source behind the object. The luminance map defines the subsurface opacity of the mesh. Note that, in comparing the bottom-left portion of FIG. 6 with the top-left portion of FIG. 6, the features of the initial model are more illuminated and noticeable after the white light is transmitted through the mesh, and after the luminance map defines the mesh's subsurface opacity. A secondary texture map informs the PBR renderer of a color filter that is applied to light that is allowed through the mesh's volume. This light is then added to the surface color, which is determined by other texture maps (such as an albedo map, a gloss map, a metallic map, or similar maps). Finally, the bottom-right portion of FIG. 6 depicts a color map for the subsurface of the post-luminance model, with the color map showing differences in the color at the surface of the model as compared with the subsurface of the model. The differences in color applied to the subsurface of the model, in accordance with the methods described above, contribute to the increased accuracy of the models generated through the methods described herein.

Figure 7A:
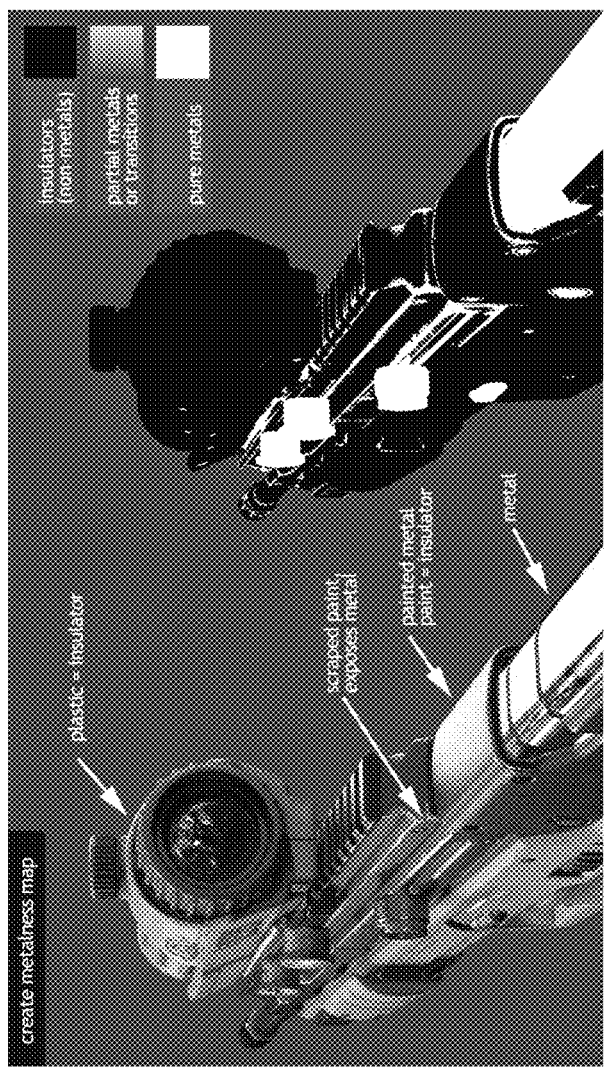
FIG. 7A depicts an image showing metallic mapping.
Figure 7B:
FIG. 7B depicts a series of images showing metallic mapping of the objects depicted in FIG. 7A.

Turning now to FIGS. 7A-7B, the methods of the present invention can be used to map metalness on a model to thereby more accurately depict variations in metallic qualities in a model or a final 3D printed object. By providing accurate renderings of the metallic characteristics of an object, the methods described herein can provide an accurate texture map of a model of the object, and ultimately an accurate texture on a printed object. Accordingly, as shown in FIG. 7A, an initial model (shown on the left-side of FIG. 7A) includes a variety of materials, including plastic (also referred to as an insulator component); pure metal; and transition or otherwise partial metal components. The right-side of FIG. 7A shows the metalness map for the model, differentiation between non-metallic components (shown in black); purely metallic components (shown in white); and partially-metallic components (shown in grey). The workflow to determine the metalness map is shown in detail in FIG. 7B.

Figure 8:
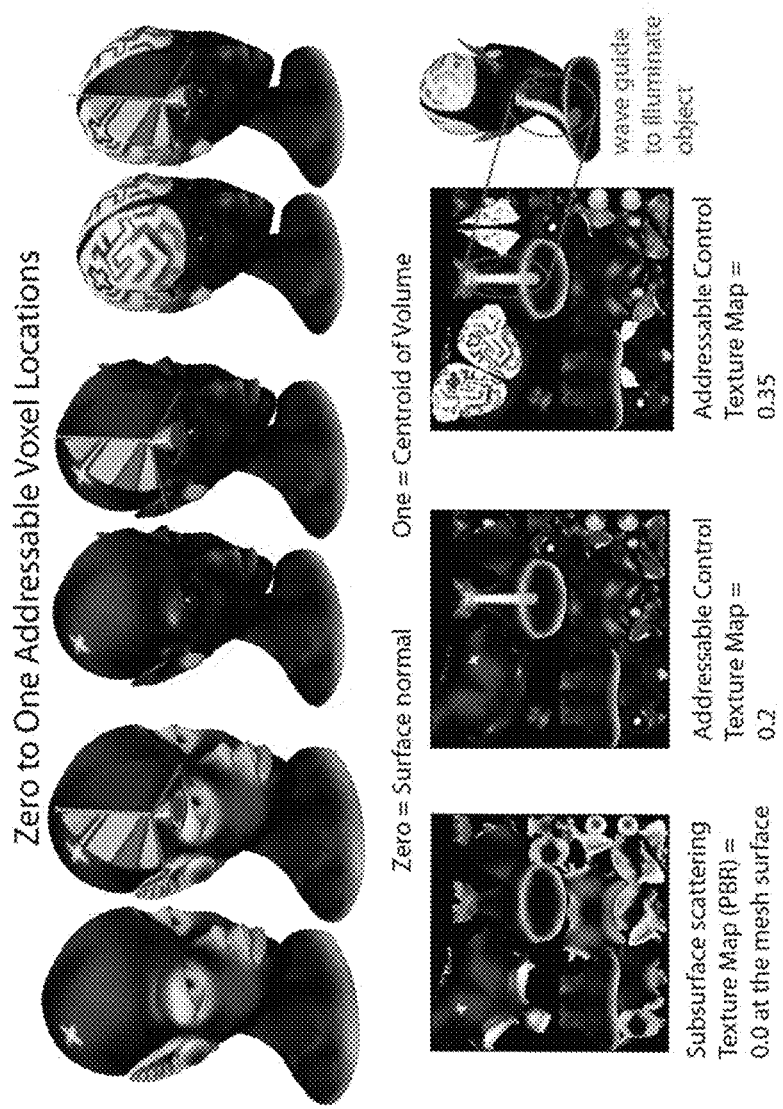
FIG. 8 depicts voxel locations of a three-dimensional model, in accordance with an embodiment of the present invention.

Finally, FIG. 8 depicts a voxel location determination process in accordance with an embodiment of the present invention. As noted in FIG. 3B above, a cross-section of a voxel model includes a volume defined by a surface normal and a central point of the model. The surface normal position of the voxel model is assigned a value of 0, and the central point of the model is assigned a value of 1, such that scale of values from the surface normal to the central point of the model is calculated from 0 to 1. The voxel locations (also referred to as voxel addresses) allow for small scale, intricate customization of the voxels based on the selected position. For example, as shown in FIG. 8, a subsurface scattering texture map is located at a surface normal position of 0.0. Addressable control texture maps at position 0.2 and position 0.35 are also shown, including a waveguide used to illuminate the object.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of generating accurate subsurface textures for an additive manufactured object comprising the steps of:
    generating a virtual three-dimensional model of an object to be printed via additive manufacturing;
    dividing the three-dimensional model into a plurality of surface voxels on a surface of the model overlaying a plurality of subsurface voxels beneath the surface of the model, each of the plurality of surface voxels and each of the plurality of subsurface voxels being equal in size, shape, volume, and area;
    calculating a texture map for each of the plurality of surface voxels;
    projecting the calculated texture map from the surface of the three-dimensional model to a center point of the model to generate a gradient of the texture map from the plurality of surface voxels to the center point, thereby overlaying the texture map gradient onto the plurality of subsurface voxels;
    from a database, selecting at least one texture from a plurality of textures and at least one material from a plurality of materials, the at least one texture and the at least one material selected to match the calculated texture map and the generated gradient of the three-dimensional model;
    applying the selected at least one texture and the selected at least one material to the plurality of surface voxel and the plurality of subsurface voxels; and
    instructing an additive manufacturing machine to manufacture a printed three-dimensional object including the selected at least one texture and the selected at least one material, such that the printed three-dimensional object includes an accurate set of optical properties.

2. The method of claim 1, further comprising a step of generating a support material layer on an outer surface of the virtual three-dimensional model.

3. The method of claim 2, wherein the step of instructing the additive manufacturing machine to manufacture the printed three-dimensional object includes a step of instructing the additive manufacturing machine to overlay the support material on an outer surface of the printed three-dimensional object.

4. The method of claim 3, further comprising a step of generating a micro interface on the outer surface of the virtual three-dimensional model prior to the step of instructing the additive manufacturing machine to manufacture the printed three-dimensional object, such that the printed three-dimensional object includes a micro interface layer between the outer surface of the printed three-dimensional object and the support material, thereby facilitating removal of the support material from the printed three-dimensional object.

5. The method of claim 1, further comprising a step of calculating a subsurface scattering map for each of the plurality of surface voxels and for each of the plurality of subsurface voxels.

6. The method of claim 1, wherein the step of projecting the calculated texture map from the surface of the three-dimensional model to the center point of the model further comprises a step of assigning texture percentages to each of the plurality of subsurface voxels to create the texture gradient.

7. The method of claim 1, further comprising a step of calibrating the selected at least one texture and the selected at least one material for at least one of the plurality of surface voxels and the plurality of subsurface voxels by comparing the selected at least one texture and the selected at least one material to the virtual three-dimensional model.

8. A method of manufacturing a printed three-dimensional object comprising the steps of:
dividing a three-dimensional model of an object to be printed via additive manufacturing into a plurality of surface voxels on a surface of the model overlaying a plurality of subsurface voxels beneath the surface of the model, each of the plurality of surface voxels and each of the plurality of subsurface voxels being equal in size, shape, volume, and area;
calculating a texture map for each of the plurality of surface voxels;
projecting the calculated texture map from the surface of the three-dimensional model to a center point of the model to generate a gradient of the texture map from the plurality of surface voxels to the center point by assigning texture percentages to each of the plurality of subsurface voxels to create the texture gradient, thereby overlaying the texture map gradient onto the plurality of subsurface voxels;
from a database, selecting at least one texture from a plurality of textures and at least one material from a plurality of materials, the at least one texture and the at least one material selected to match the calculated texture map and the generated gradient of the three-dimensional model;
applying the selected at least one texture and the selected at least one material to the plurality of surface voxel and the plurality of subsurface voxels; and
instructing an additive manufacturing machine to manufacture a printed three-dimensional object including the selected at least one texture and the selected at least one material, such that the printed three-dimensional object includes an accurate set of optical properties.

9. The method of claim 8, further comprising a step of generating a support material layer on an outer surface of the virtual three-dimensional model.

10. The method of claim 9, wherein the step of instructing the additive manufacturing machine to manufacture the printed three-dimensional object includes a step of instructing the additive manufacturing machine to overlay the support material on an outer surface of the printed three-dimensional object.

11. The method of claim 10, further comprising a step of generating a micro interface on the outer surface of the virtual three-dimensional model prior to the step of instructing the additive manufacturing machine to manufacture the printed three-dimensional object, such that the printed three-dimensional object includes a micro interface layer between the outer surface of the printed three-dimensional object and the support material, thereby facilitating removal of the support material from the printed three-dimensional object.

12. The method of claim 8, further comprising a step of calculating a subsurface scattering map for each of the plurality of surface voxels and for each of the plurality of subsurface voxels.

13. The method of claim 8, further comprising a step of calibrating the selected at least one texture and the selected at least one material for at least one of the plurality of surface voxels and the plurality of subsurface voxels by comparing the selected at least one texture and the selected at least one material to the virtual three-dimensional model.

14. A method of generating accurate subsurface textures for an additive manufactured object comprising the steps of:
generating a virtual three-dimensional model of an object to be printed via additive manufacturing;
generating a support material layer on an outer surface of the virtual three-dimensional model;
dividing the three-dimensional model into a plurality of surface voxels on the outer surface of the model overlaying a plurality of subsurface voxels beneath the outer surface of the model, each of the plurality of surface voxels and each of the plurality of subsurface voxels being equal in size, shape, volume, and area;
calculating a texture map for each of the plurality of surface voxels;
projecting the calculated texture map from the surface of the three-dimensional model to a center point of the model to generate a gradient of the texture map from the plurality of surface voxels to the center point, thereby overlaying the texture map gradient onto the plurality of subsurface voxels;
from a database, selecting at least one texture from a plurality of textures and at least one material from a plurality of materials, the at least one texture and the at least one material selected to match the calculated texture map and the generated gradient of the three-dimensional model;
applying the selected at least one texture and the selected at least one material to the plurality of surface voxel and the plurality of subsurface voxels;
generating a micro interface on the outer surface of the virtual three-dimensional model;
instructing an additive manufacturing machine to overlay the support material on an outer surface of a printed three-dimensional object; and
instructing the additive manufacturing machine to manufacture the printed three-dimensional object including the selected at least one texture and the selected at least one material, such that the printed three-dimensional object includes an accurate set of optical properties,
wherein the printed three-dimensional object includes a micro interface layer between the outer surface of the printed three-dimensional object and the support material, thereby facilitating removal of the support material from the printed three-dimensional object.

15. The method of claim 14, further comprising a step of calculating a subsurface scattering map for each of the plurality of surface voxels and for each of the plurality of subsurface voxels.

16. The method of claim 14, wherein the step of projecting the calculated texture map from the surface of the three-dimensional model to the center point of the model further comprises a step of assigning texture percentages to each of the plurality of subsurface voxels to create the texture gradient.

17. The method of claim 14, further comprising a step of calibrating the selected at least one texture and the selected at least one material for at least one of the plurality of surface voxels and the plurality of subsurface voxels by comparing the selected at least one texture and the selected at least one material to the virtual three-dimensional model.

\* \* \* \* \*